(12) United States Patent  (10) Patent No.: US 7,625,200 B2
Leavitt  (45) Date of Patent: Dec. 1, 2009

(54) EXTRUSION HEAD FOR USE IN EXTRUSION-BASED LAYERED DEPOSITION MODELING

(75) Inventor: Paul J. Leavitt, Minneapolis, MN (US)

(73) Assignee: Stratasys, Inc., Eden Prairie, MN (US)

( * ) Notice: Subject to any disclaimer, the term of this patent is extended or adjusted under 35 U.S.C. 154(b) by 153 days.

(21) Appl. No.: 11/888,076

(22) Filed: Jul. 31, 2007

(65) Prior Publication Data

US 2009/0035405 A1 Feb. 5, 2009

(51) Int. Cl.
*B28B 1/14* (2006.01)
(52) U.S. Cl. .................. 425/375; 425/182; 425/192 R; 264/113; 264/308
(58) Field of Classification Search ............. 425/174.4, 425/375, 182, 192 R, 376.1; 264/308, 401, 264/497, 113
See application file for complete search history.

(56) References Cited

U.S. PATENT DOCUMENTS

| | | | |
|---|---|---|---|
| 4,928,897 A | 5/1990 | Satou et al. | |
| 5,121,329 A | 6/1992 | Crump | |
| 5,169,081 A | 12/1992 | Goedderz | |
| 5,216,616 A * | 6/1993 | Masters | 264/401 |
| 5,303,141 A | 4/1994 | Batchelder et al. | |
| 5,312,224 A | 5/1994 | Batchelder et al. | |
| 5,340,433 A | 8/1994 | Crump | |
| 5,431,555 A | 7/1995 | Boissonnat et al. | 425/378.2 |
| 5,503,785 A | 4/1996 | Crump et al. | |
| 5,594,652 A | 1/1997 | Penn et al. | |
| 5,633,021 A * | 5/1997 | Brown et al. | 425/375 |
| 5,695,707 A | 12/1997 | Almquist et al. | |
| 5,764,521 A | 6/1998 | Batchelder et al. | |
| 5,786,654 A | 7/1998 | Yoshida et al. | 310/328 |
| 5,816,466 A | 10/1998 | Seufer | |
| 5,866,058 A | 2/1999 | Batchelder et al. | |
| 5,939,008 A | 8/1999 | Comb et al. | |
| 5,943,235 A | 8/1999 | Earl et al. | |
| 5,968,561 A | 10/1999 | Batchelder et al. | |
| 6,004,124 A | 12/1999 | Swanson et al. | |
| 6,022,207 A | 2/2000 | Dahlin et al. | |
| 6,028,410 A | 2/2000 | Leavitt et al. | |
| 6,041,991 A | 3/2000 | Mehri et al. | |
| 6,054,077 A | 4/2000 | Comb et al. | |

(Continued)

FOREIGN PATENT DOCUMENTS

EP 0254790 3/1988

OTHER PUBLICATIONS

International Search Report and Written Opinion of Foreign Application No. PCT/US08/09180, dated Oct. 24, 2008.

*Primary Examiner*—Maria Veronica D Ewald
(74) *Attorney, Agent, or Firm*—Westman, Champlin & Kelly, P.A.

(57) ABSTRACT

An extrusion head comprising at least one mounting structure, a first liquefier pump secured to the at least one mounting structure, a second liquefier pump disposed adjacent to the first liquefier pump, a toggle mechanism supported by the at least one mounting structure and configured to move the second liquefier pump relative to the first liquefier pump along a first axis, and a slot engagement assembly connected in part to the second liquefier pump for defining a range of motion for the second liquefier pump along the first axis.

20 Claims, 12 Drawing Sheets

U.S. PATENT DOCUMENTS

| | | |
|---|---|---|
| 6,067,480 A | 5/2000 | Stuffle et al. |
| 6,085,957 A | 7/2000 | Zinniel et al. |
| 6,129,872 A | 10/2000 | Jang |
| 6,193,923 B1 | 2/2001 | Leyden et al. |
| 6,214,279 B1 | 4/2001 | Yang et al. |
| 6,228,923 B1 | 5/2001 | Lombardi et al. |
| 6,238,613 B1 | 5/2001 | Batchelder et al. |
| 6,257,517 B1 | 7/2001 | Babish et al. |
| 6,364,283 B1 | 4/2002 | Sieber ............... 251/129.2 |
| 6,375,874 B1 | 4/2002 | Russell et al. |
| 6,475,282 B1 | 11/2002 | Snodgrass et al. ........... 118/663 |
| 6,508,971 B2 | 1/2003 | Leyden et al. |
| 6,532,394 B1 | 3/2003 | Earl et al. |
| 6,547,995 B1 | 4/2003 | Comb |
| 6,572,807 B1 | 6/2003 | Fong |
| 6,578,596 B1 | 6/2003 | Batchelder et al. |
| 6,629,011 B1 | 9/2003 | Calderon et al. |
| 6,645,412 B2 | 11/2003 | Priedeman, Jr. et al. |
| 6,685,866 B2 | 2/2004 | Swanson et al. |
| 6,722,872 B1 | 4/2004 | Swanson et al. |
| 6,749,414 B1 | 6/2004 | Hanson et al. |
| 6,776,602 B2 | 8/2004 | Swanson et al. |
| 6,814,907 B1 | 11/2004 | Comb |
| 6,879,065 B2 | 4/2005 | Corbett et al. ............... 310/12 |
| 6,907,307 B2 | 6/2005 | Chen et al. |
| 6,923,634 B2 | 8/2005 | Swanson et al. |
| 6,989,115 B2 | 1/2006 | Russell et al. |
| 7,026,574 B2 | 4/2006 | Belfiore et al. |
| 2003/0076371 A1 | 4/2003 | Fong |
| 2007/0228590 A1 | 10/2007 | LaBossiere et al. |
| 2007/0228592 A1 | 10/2007 | Dunn et al. |
| 2007/0233298 A1 | 10/2007 | Heidi et al. |

\* cited by examiner

US 7,625,200 B2

EXTRUSION HEAD FOR USE IN EXTRUSION-BASED LAYERED DEPOSITION MODELING

BACKGROUND

The present invention relates to extrusion-based layered deposition systems for building three-dimensional (3D) objects. In particular, the present invention relates to extrusion heads for use in extrusion-based layered deposition systems.

An extrusion-based layered deposition system (e.g., fused deposition modeling systems developed by Stratasys, Inc., Eden Prairie, Minn.) is used to build a 3D object from a computer-aided design (CAD) model in a layer-by-layer manner by extruding a flowable build material. The build material is extruded through an extrusion tip carried by an extrusion head, and is deposited as a sequence of roads on a substrate in an x-y plane. The extruded build material fuses to previously deposited build material, and solidifies upon a drop in temperature. The position of the extrusion head relative to the substrate is then incremented along a z-axis (perpendicular to the x-y plane), and the process is then repeated to form a 3D object resembling the CAD model.

Movement of the extrusion head with respect to the substrate is performed under computer control, in accordance with build data that represents the 3D object. The build data is obtained by initially slicing the CAD model of the 3D object into multiple horizontally sliced layers. Then, for each sliced layer, the host computer generates a build path for depositing roads of build material to form the 3D object.

In fabricating 3D objects by depositing layers of build material, supporting layers or structures are typically built underneath overhanging portions or in cavities of objects under construction, which are not supported by the build material itself. A support structure may be built utilizing the same deposition techniques by which the build material is deposited. The host computer generates additional geometry acting as a support structure for the overhanging or free-space segments of the 3D object being formed. Support material is then deposited from a second nozzle pursuant to the generated geometry during the build process. The support material adheres to the build material during fabrication, and is removable from the completed 3D object when the build process is complete.

An increasing trend in the use of extrusion-based layered deposition systems involves the fabrication of large quantities of 3D objects, typically referred to as rapid manufacturing. In addition to building large quantities of identical 3D objects, rapid manufacturing may also be used to optimize a design of a 3D object by building numerous 3D objects having design variations, thereby allowing the design variations to be subsequently tested. Due to the large quantities, the components of extrusion-based layered deposition systems, particularly the extrusion heads, require good durability and reliability over extended periods of use. Thus, there is an ongoing need for improvements in the durability and reliability of extrusion heads for building 3D objects and corresponding support structures.

SUMMARY

The present invention relates to an extrusion head for use in an extrusion-based layered deposition system. The extrusion head includes a mounting structure, a first liquefier pump secured to the mounting structure, a second liquefier pump disposed adjacent to the first liquefier pump, a toggle mechanism supported by the mounting structure, and a slot engagement assembly connected in part to the second liquefier pump. The toggle mechanism is configured to move the second liquefier pump relative to the first liquefier pump along a first axis, and the slot engagement assembly defines a range of motion for the second liquefier pump along the first axis.

DETAILED DESCRIPTION

Figure 1:
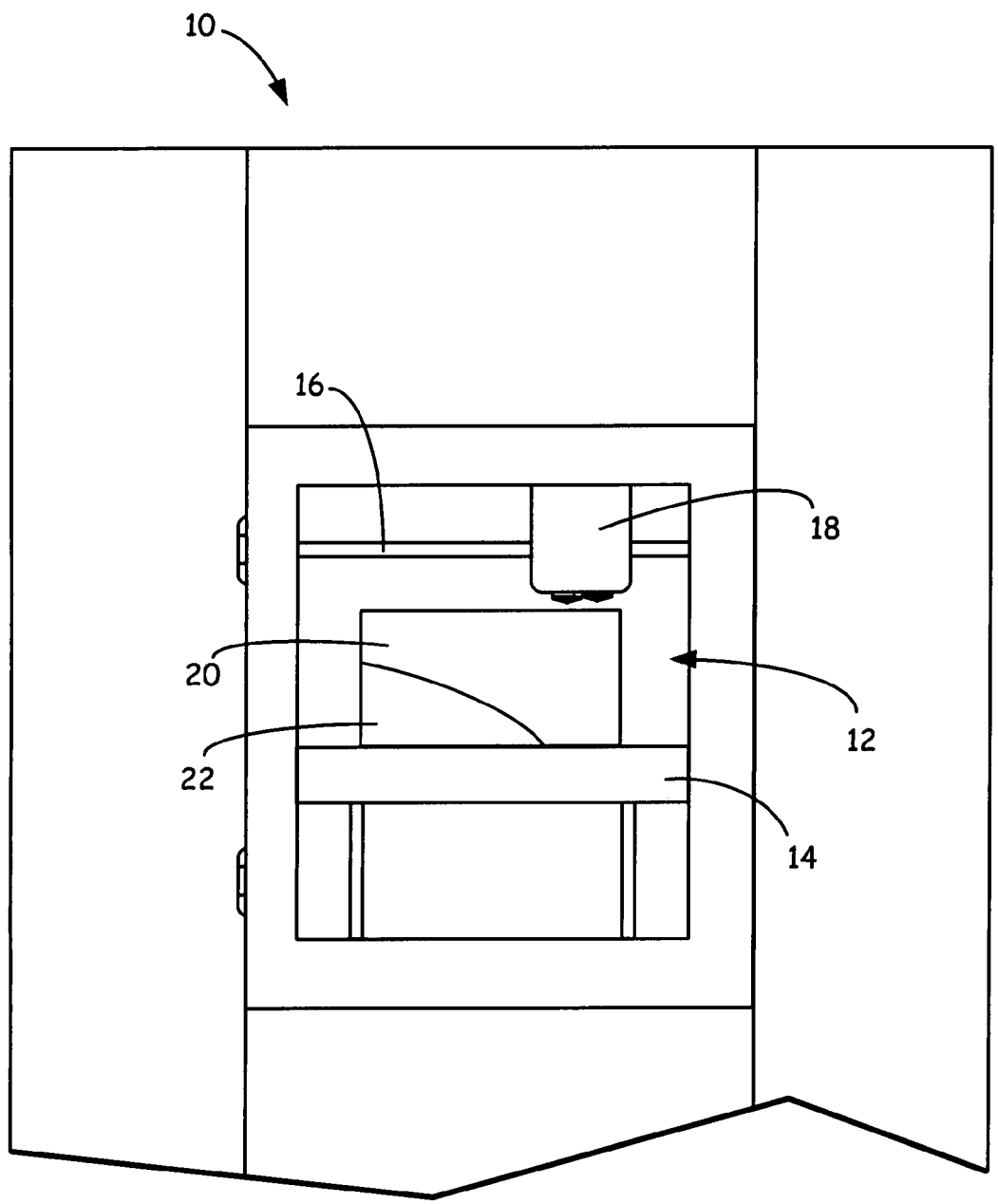
FIG. 1 is a front view of an extrusion-based layered deposition system for building 3D objects and support structures.

FIG. 1 is a front view of system 10, which is an extrusion-based layered deposition system that includes build chamber 12, substrate 14, gantry 16, and extrusion head 18. Suitable systems for system 10 include fused deposition modeling systems developed by Stratasys, Inc., Eden Prairie, Minn. Build chamber 12 is an enclosed environment that contains substrate 14, gantry 16, and extrusion head 18 for building a 3D object (referred to as 3D object 20) and a corresponding support structure (referred to as support structure 22). It is understood that the geometric shapes of 3D object 20 and support structure 22 are merely exemplary, and that system 10 is suitable for building 3D objects and support structures having a variety of different geometric designs.

Substrate 14 is a platform on which 3D object 20 and support structure 22 are built, and moves along a vertical z-axis based on signals provided from a computer-operated controller (not shown). Gantry 16 is a guide rail system configured to move extrusion head 18 in a horizontal x-y plane within build chamber 12 based on signals provided from the computer-operated controller. The horizontal x-y plane is a plane defined by an x-axis and a y-axis (not shown in FIG. 1), where the x-axis, the y-axis, and the z-axis are orthogonal to each other. As used herein, the term "axis" refers to a coordinate axis of a spatial coordinate system (e.g., a Cartesian coordinate system).

Extrusion head 18 is a dual-tip extrusion head supported by gantry 16 for building 3D object 20 and support structure 22 on substrate 14 in a layer-by-layer manner. As discussed below, extrusion head 18 is configured to toggle between a "build state" and a "support state", where extrusion head 18 deposits a build material for 3D object 20 in the build state and deposits a support material for support structure 22 in the support state. In a preferred embodiment, the build material and the support material are each provided to extrusion head 18 as a continuous filament. Examples of suitable filaments, and suitable assemblies for supplying filaments to system 10, are disclosed in Swanson et al., U.S. Pat. No. 6,923,634 and Comb et al., U.S. Pat. No. 7,122,246. While the materials of are discussed herein as being build materials and support materials, suitable materials for use with extrusion head 18 include any type of extrudable material (e.g., thermoplastic materials).

During a build operation, extrusion head 18 is initially positioned in the build state, which allows extrusion head 18 to deposit the build material in a sequence of roads to form a layer of 3D object 20. After the layer of 3D object 20 is complete, extrusion head 18 then toggles to the support state, which allows extrusion head 18 to deposit the support material in a sequence of roads to form a layer of support structure 22. The layer of support structure 22 may then be used to vertically support subsequent layers of deposited build and/or support materials. After the layer of support structure 22 is complete, substrate 14 is lowered along the z-axis by a single layer increment, and extrusion head 18 toggles back to the build state to form a subsequent layer of 3D object 20. This process may be repeated until each layer of 3D object 20 and support structure 22 are complete. In an alternative arrangement, extrusion head 18 may initially be positioned in the support state for forming a layer of support structure 22, and then toggle to the build state to form a layer of 3D object 20.

For even a single 3D object and corresponding support structure (e.g., 3D object 20 and support structure 22), extrusion head 18 toggles between the build state and the support state numerous times. This number is multiplied when fabricating large quantities of 3D objects and support structures in a rapid manufacturing process. Because the toggling of extrusion head 18 involves mechanical movements of the components of extrusion head 18, the numerous togglings may raise concerns of wear and misalignments for one or more of the components. Such wear and misalignments may reduce the quality and accuracy of the resulting 3D objects and support structures. However, as discussed below, extrusion head 18 includes safeguards to reduce the risks of wear and misalignments, thereby allowing extrusion head 18 to be used in build operations over extended periods of use (e.g., rapid manufacturing processes).

Figure 2A:
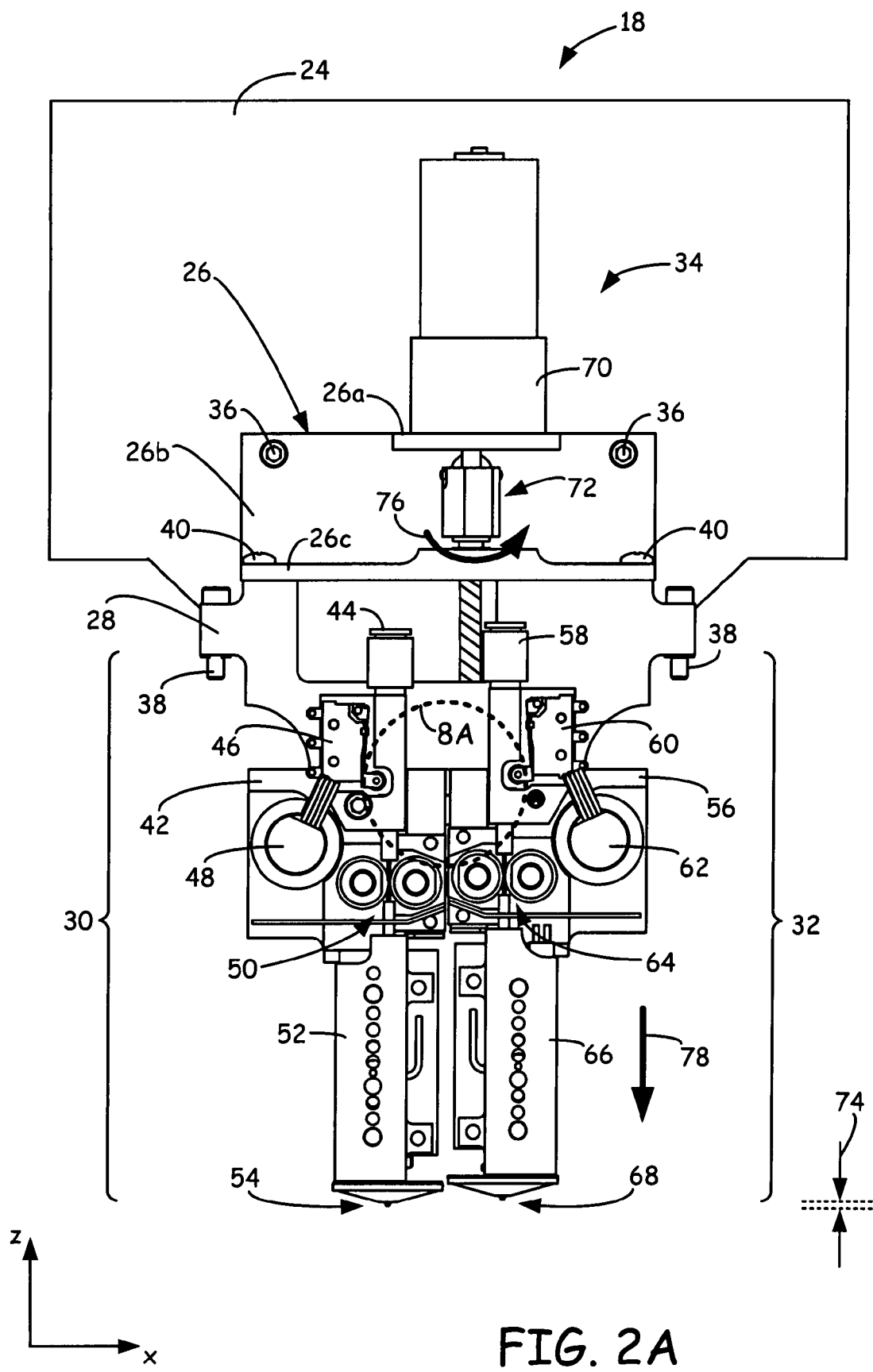
FIG. 2A is a front view of an extrusion head of the extrusion-based layered deposition system, where the extrusion head is disposed in a build state.
Figure 2B:
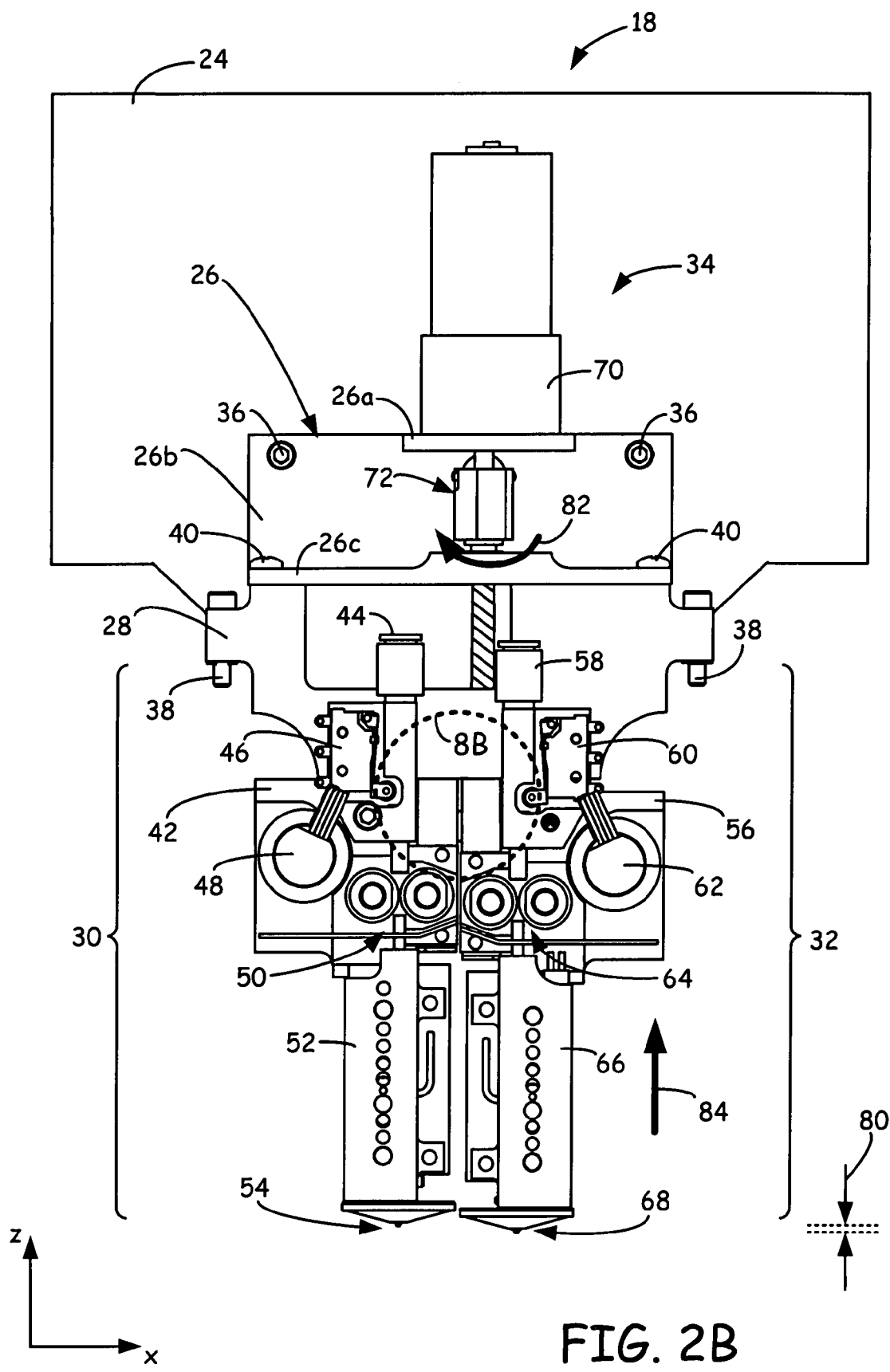
FIG. 2B is a front view of the extrusion head disposed in a support state.

FIGS. 2A and 2B are front views of extrusion head 18 (outer casing and cooling air lines omitted), where extrusion head 18 is disposed in the build state in FIG. 2A and in the support state in FIG. 2B. As shown in FIG. 2A, extrusion head 18 includes circuit board bracket 24, motor bracket 26, spanner block 28, build liquefier pump 30, support liquefier pump 32, and toggle mechanism 34. Circuit board bracket 24 is a first mounting structure that contains a circuit board (not shown) of extrusion head 18 for communicating with the computer-operated controller (not shown). Motor bracket 26 is a second mounting structure that includes ceiling portion 26a, wall portion 26b, and floor portion 26c, where ceiling portion 26a and floor portion 26c are generally parallel and are connected to opposing ends of wall portion 26b. Wall portion 26b is secured to circuit board bracket 24 with bolts 36, thereby allowing ceiling portion 26a and floor portion 26c to retain toggle mechanism 34.

Spanner block 28 is a third mounting structure secured to circuit board bracket 24 with rear-facing bolts (not shown), and to gantry 16 (shown in FIG. 1) with screws 38. Screws 38 are desirably captive to prevent them from falling out when extrusion head 18 is removed, and are desirably positioned along the center of gravity of extrusion head 18 to reduce deflection of build liquefier pump 30 and support liquefier pump 32 during high acceleration moves. Spanner block 28 is also secured to floor portion 26c of motor bracket 26 with bolts 40. Circuit board bracket 24, motor bracket 26, and spanner block 28 are desirably secured tightly together to prevent relative movement between circuit board bracket 24, motor bracket 26, and spanner block 28 while extrusion head 18 moves around build chamber 12 (shown in FIG. 1) during a build operation.

Build liquefier pump 30 is a liquefier pump secured to spanner block 28 for extruding a filament of build material (not shown) from a build material source (not shown). Build liquefier pump 30 includes base block 42, filament inlet 44, filament detection switch 46, motor 48, drive wheel assembly 50, liquefier 52, and build tip 54. Base block 42 is the portion of liquefier pump 30 that is secured to spanner block 28, thereby preventing relative movement between build liquefier pump 30 and spanner block 28. Filament inlet 44 is supported by base block 42, and is a connection point for a filament supply line (not shown) that provides the build material filament to extrusion head 18. Filament detection switch 46 is also supported by base block 42 and provides a means for detecting when the build material filament reaches build liquefier pump 30. Filament detection switch 46 may also detect the loss of the build material filament when unloading build liquefier pump 30.

Motor 48 is a drive motor (e.g., a servo motor) secured to base block 42 for operating drive wheel assembly 50. Drive wheel assembly 50 is an assembly of wheels, gears, and conduits mounted to base block 42 and powered by motor 48 for feeding successive portions of the build material filament from filament inlet 44 to liquefier 52. Examples of suitable configurations for motor 48 and drive wheel assembly 50 are disclosed in LaBossiere et al., U.S. Publication No. 2007/0003656. Liquefier 52 is a heated block that melts the received build material filament, thereby allowing the molten build material to flow to build tip 54. Build tip 54 is an extrusion tip aligned along the z-axis for extruding the molten build material to form layers of 3D object 20 (shown in FIG. 1).

Support liquefier pump 32 is a liquefier pump translated by toggle mechanism 34 for extruding a filament of support material (not shown) from a support material source (not shown). Support liquefier pump 32 includes base block 56, filament inlet 58, filament detection switch 60, motor 62, drive wheel assembly 64, liquefier 66, and build tip 68. Base block 56 is the portion of support liquefier pump 32 that is moveably supported by toggle mechanism 34. Filament inlet 58 is supported by base block 56, and is a connection point for a filament supply line (not shown) that provides the support material filament to extrusion head 18. Filament detection switch 60 is also supported by base block 56 and functions in the same manner as filament detection switch 46 for detecting when the support material filament reaches support liquefier pump 32, and for detecting the loss of the support material filament when unloading support liquefier pump 32.

Motor 62 is a drive motor (e.g., a servo motor) secured to base block 56 for operating drive wheel assembly 64. Drive wheel assembly 64 is an assembly of wheels, gears, and conduits mounted to base block 56 and powered by motor 62 for feeding successive portions of the support material filament from filament inlet 58 to liquefier 66. Examples of suitable configurations for motor 62 and drive wheel assembly 64 include those discussed above for motor 48 and drive wheel assembly 50. Liquefier 66 is a heat exchanger block similar to liquefier 52 that melts the received support material filament, thereby allowing the molten support material to flow to support tip 68. Support tip 68 is an extrusion tip also aligned along the z-axis for extruding the molten support material to form layers of support structure 22 (shown in FIG. 1).

Toggle mechanism 34 is a mechanism configured to adjust the position of support liquefier pump 32 along the z-axis, and includes toggle motor 70 and torque assembly 72. Toggle motor 70 is a motor configured to provide rotational power (e.g., a direct current (DC) motor) to torque assembly 72, and is secured to ceiling portion 26a of motor bracket 26. Torque assembly 72 is retained by floor portion 26c of motor bracket 26, and interconnects toggle motor 70 and support liquefier pump 32. This allows the rotational power of toggle motor 70 to adjust the position of support liquefier pump 32 along the z-axis.

During a build operation to form a layer of 3D object 20, extrusion head 18 is disposed in the build state, where toggle mechanism 34 retains support liquefier pump 32 in a raised position (as shown in FIG. 2A). In the raised position, support tip 68 extends higher than build tip 54 along the z-axis by raised offset distance 74. Examples of suitable distances for raised offset distance 74 include distances of at least about 1.0 millimeter, with particularly suitable distances ranging from about 1.3 millimeters to about 3.0 millimeters, and with even more particularly suitable distances ranging from about 1.5 millimeters to about 2.0 millimeters. Raised offset distance 74 allows build liquefier pump 30 to extrude roads of build material to form a layer of 3D object 20 without interference from support tip 68. Moreover, raised offset distance 74 reduces the risk of support material becoming embedded in 3D object 20. While extrusion head 18 is disposed in the build state, residual amounts of support material may potentially ooze from support liquefier pump 32. However, positioning support tip 68 higher than build tip 54 by raised offset distance 74 reduces the risk that the residual support material comes into contact with the layer of 3D object 20 being formed.

While extrusion head 18 is disposed in the build state, motor 48 and drive wheel assembly 50 feed successive portions of the build material filament into liquefier 52. Liquefier 52 includes a thermal gradient that melts the build material filament while the build material filament travels through liquefier 52. The thermal gradient of liquefier 52 may vary depending on the build material used, and desirably allows the unmelted portion of the build material filament to function as a piston to extrude the molten portion out of liquefier 52 and build tip 54. As discussed above, the extruded build material is then deposited in a sequence of roads to form a layer of 3D object 20.

When the given layer of 3D object 20 is complete, motor 48 is halted, thereby stopping the extrusion process through build liquefier pump 30. Toggle motor 70 then rotates torque assembly 72 in a direction of rotational arrow 76. The rotation of torque assembly 72 in the direction of rotational arrow 76 causes support liquefier pump 32 to move downward along the z-axis (represented by arrow 78) until support liquefier pump 32 reaches a lowered position. When support liquefier pump 32 reaches the lowered position, toggle motor 70 desirably continues to apply a low to moderate amount of rotational power to torque assembly 72 in the direction of rotational arrow 76 to retain support liquefier pump 32 in the lowered position. As discussed below, this prevents support liquefier pump 32 from moving horizontally or vertically relative to build liquefier pump 30 while extrusion head 18 moves around build chamber 12 (shown in FIG. 1) in the support state.

FIG. 2B shows extrusion head 18 is disposed in the support state, where toggle mechanism 34 retains support liquefier pump 32 in the lowered position. In the lowered position, support tip 68 extends lower than build tip 54 along the z-axis by lowered offset distance 80. Examples of suitable distances for lowered offset distance 80 include distances of at least about 1.0 millimeter, with particularly suitable distances ranging from about 1.3 millimeters to about 3.0 millimeters, and with even more particularly suitable distances ranging from about 1.5 millimeters to about 2.0 millimeters. Lowered offset distance 80 allows support liquefier pump 32 to extrude roads of support material to build support structure 22 (shown in FIG. 1) without interference from build tip 54. Moreover, lowered offset distance 80 reduces the risk of build material becoming embedded in support structure 22, in the same manner as discussed above for raised offset distance 74 (shown in FIG. 2A).

In the embodiment shown in FIGS. 2A and 2B, support liquefier pump 32 extends along the z-axis in both the raised position (as shown in FIG. 2A) and the lowered position (as shown in FIG. 2B). In particular, support tip 68 extends along the z-axis when support liquefier pump 32 is in both the raised and lowered positions. As such, in this embodiment, support liquefier pump 32 pre-aligned along the z-axis, and does not need to be recalibrated to begin extruding support material after being moved from the raised position to the lowered position. This reduces time required during a build operation.

While extrusion head 18 is disposed in the support state, motor 62 causes drive wheel assembly 64 to feed successive portions of the support material filament into liquefier 66. Liquefier 66 includes a thermal gradient that melts the support material filament while the support material filament travels through liquefier 66. The thermal gradient of liquefier 66 may also vary depending on the support material used, and desirably allows the unmelted portion of the support material filament to function as a piston to extrude the molten portion out of liquefier 66 and build tip 68. The extruded support material is then deposited in a sequence of roads to form a layer of support structure 22.

After the given layer of support structure 22 is complete, motor 62 is halted, thereby stopping the extrusion process through support liquefier pump 32. Toggle motor 70 then rotates torque assembly 72 in a direction of rotational arrow 82, which is an opposite rotational direction to that of rotational arrow 76 (shown in FIG. 2A). The rotation of torque assembly 72 in the direction of rotational arrow 82 causes support liquefier pump 32 to move upward along the z-axis (represented by arrow 84) until support liquefier pump 32 reaches the raised position. When support liquefier pump 32 reaches the raised position, toggle motor 70 desirably continues to apply a low to moderate amount of rotational power to torque assembly 72 in the direction of rotational arrow 82 to retain support liquefier pump 32 in the raised position. This prevents support liquefier pump 32 from moving horizontally or vertically relative to build liquefier pump 30 while extrusion head 18 moves around build chamber 12 (shown in FIG. 1) in the build state.

In an alternative embodiment, support liquefier pump 32 is raised and lowered with opposite rotations of torque assembly 72 from those discussed above. In this embodiment, support liquefier pump 32 is lowered along the z-axis in the direction of arrow 78 (shown in FIG. 2A) when torque assembly 72 is rotated in the direction of rotational arrow 82, and is raised along the z-axis in the direction of arrow 84 when torque assembly 72 is rotated in the direction of rotational arrow 76. In another alternative embodiment, build liquefier pump 30 is interchanged with support liquefier pump 32 such that build liquefier pump 30 is adjustable along the z-axis via toggle mechanism 34, and support liquefier pump 32 is secured to spanner block 28.

Figure 3:
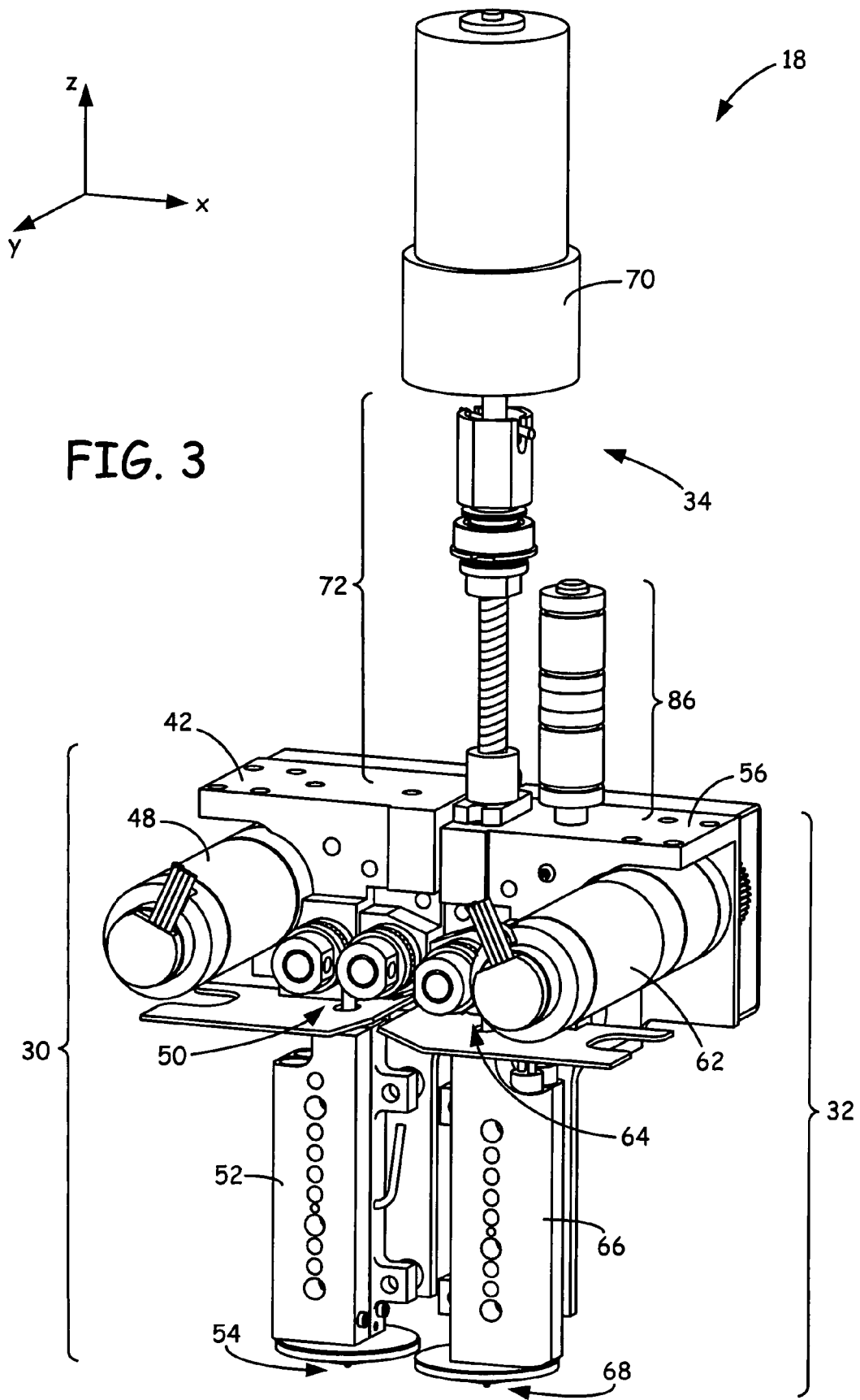
FIG. 3 is a front perspective view of the extrusion head with components omitted.

FIG. 3 is a front perspective view of extrusion head 18, where circuit board bracket 24, motor bracket 26, spanner block 28, filament inlets 44 and 58, and filament detection switches 46 and 60 are omitted for ease of discussion. Thus, FIG. 3 shows build liquefier pump 30, support liquefier pump 32, and toggle mechanism 34, where support liquefier pump 32 is in the lowered position (i.e., extrusion head 18 is in the support state). As shown, toggle mechanism 34 further includes linear bearing assembly 86 secured to base block 56 of support liquefier pump 32. Linear bearing assembly 86 are retained by spanner block 28 (shown in FIGS. 2A and 2B) for guiding support liquefier pump 32 while toggle mechanism 34 raises and lowers support liquefier pump 32 along the z-axis. This reduces the lateral movement of support liquefier pump 32 in the x-y plane while support liquefier pump 32 is raised and lowered along the z-axis.

Figure 4:
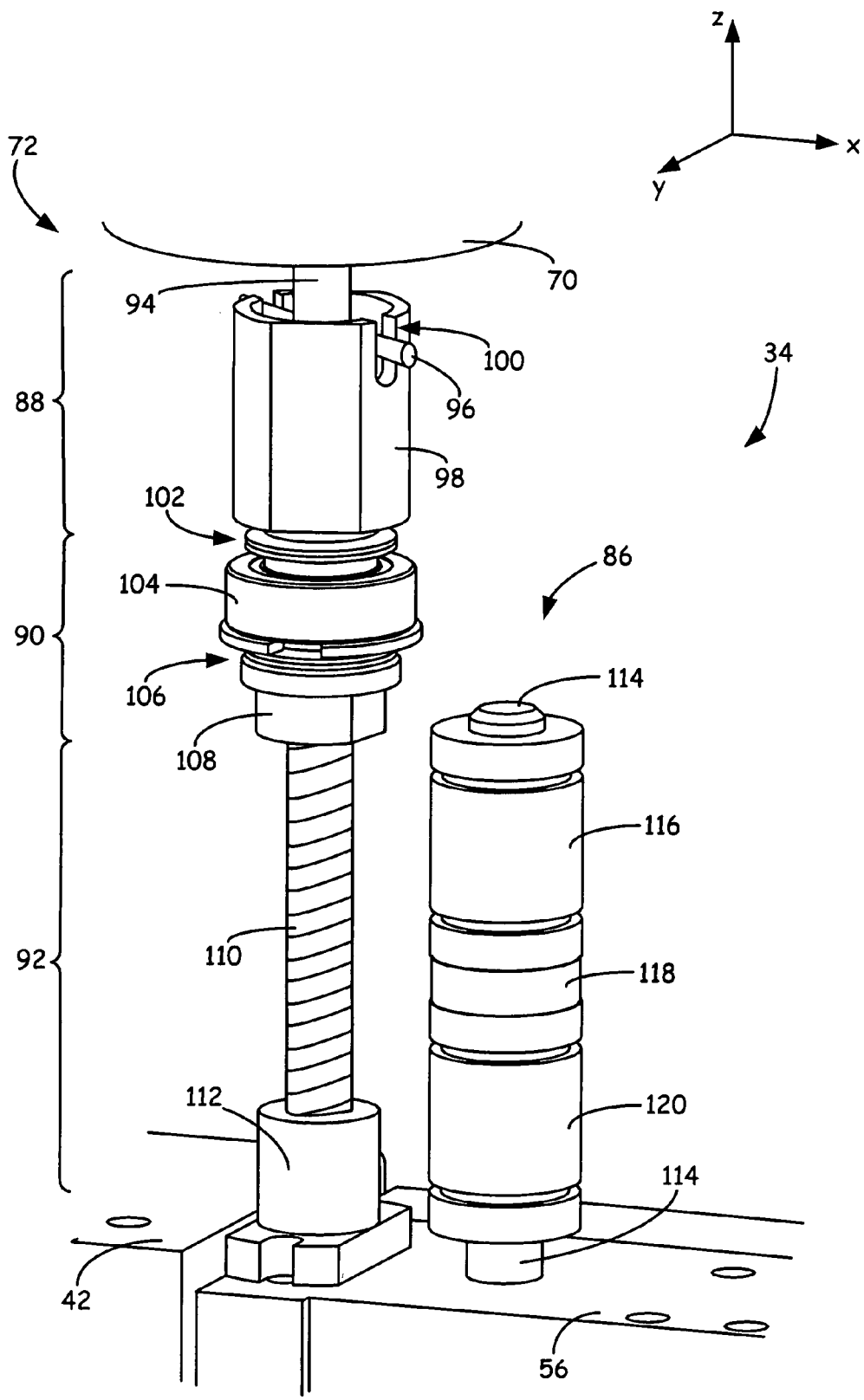
FIG. 4 is an expanded front perspective view of a torque assembly and linear bearing assembly of the extrusion head.

FIG. 4 is an expanded front perspective view of torque assembly 72 and linear bearing assembly 86. As shown, torque assembly 72 includes upper portion 88, middle portion 90, and lower portion 92, where upper portion 88 includes motor shaft 94, coupling pin 96, and coupling 98. Motor shaft 94 extends from toggle motor 70 and is the portion of torque assembly 72 that receives the rotational power from toggle motor 70. Coupling pin 96 is secured to motor shaft 94 such that coupling pin 96 extends orthogonal to the longitudinal axis of motor shaft 94. This allows the rotation of motor shaft 94 to correspondingly rotate coupling pin 96 in the x-y plane.

Coupling 98 extends below toggle motor 70 and motor shaft 94, and includes a pair of channels 100 through which coupling pin 96 extends for rotating coupling 98. In the embodiment shown, channels 100 have dimensions that are greater than the radial dimensions of coupling pin 96. As such, coupling pin 96 is not fixedly secured within channels 100, and may freely rotate a small distance in either rotational direction in the x-y plane, and may move vertically along the z-axis. This prevents coupling pin 96 from being frictionally bound in channels 100, which may restrict the rotation of coupling pin 96. However, if coupling pin 96 rotates far enough in either rotational direction, coupling pin 96 contacts the vertical walls of channels 100, thereby allowing coupling pin 96 to rotate coupling 98. As discussed above, while support liquefier pump 32 is disposed in the raised or lowered position, toggle motor 70 desirably continues to apply a low to moderate amount of rotational power to torque assembly 72. This applied rotational power causes coupling pin 96 to maintain contact with one of the vertical walls of channels 100, thereby preventing torque assembly 72 from rotating in the opposing rotational direction.

Middle portion 90 of torque assembly 72 includes upper deflection assembly 102, bearing 104, lower deflection assembly 106, and axial bolt 108. Upper deflection assembly 102 and lower deflection assembly 106 are biasing assemblies that compress and absorb the rotational power of toggle motor 70 when support liquefier pump 32 (shown in FIG. 3) reaches the raised and lowered positions, respectively. As discussed below, this reduces the shock load applied when support liquefier pump 32 reaches the raised and lowered positions. Bearing 104 is disposed between upper deflection assembly 102 and lower deflection assembly 106, and receives the radial thrust load of torque assembly 72. Axial bolt 108 interconnects coupling 98 and lower portion 92, and supports upper deflection assembly 102, bearing 104, lower deflection assembly 106 therebetween.

Lower portion 92 of torque assembly 72 includes threaded shaft 110 and retention nut 112. Threaded shaft 110 is a longitudinal threaded actuator (e.g., an ACME screw) having a first end secured to axial bolt 108, and a second end threadedly engaged with retention nut 112. Retention nut 112 is secured to base block 56 of support liquefier pump 32, and contains a reciprocal threading to threaded shaft 110. The threaded engagement between threaded shaft 110 and retention nut 112 allows the rotational motion of threaded shaft 110 to be converted to a vertical motion of retention nut 112 along the z-axis. The vertical motion of retention nut 112 correspondingly moves support liquefier pump 32 between the raised and lowered positions.

As further shown in FIG. 4, linear bearing assembly 86 includes bearing shaft 114, linear bearing 116, spacer 118, and linear bearing 120. Bearing shaft 114 is a longitudinal shaft secured at one end to base block 56, and extends along the z-axis adjacent to torque assembly 72. Linear bearings 116 and 120 are axially disposed on bearing shaft 114, and are offset by spacer 118. As discussed above, linear bearing assembly 86 guides the motion of support liquefier pump 32 along the z-axis when support liquefier pump 32 adjusts between the raised and lowered positions.

Figure 5A:
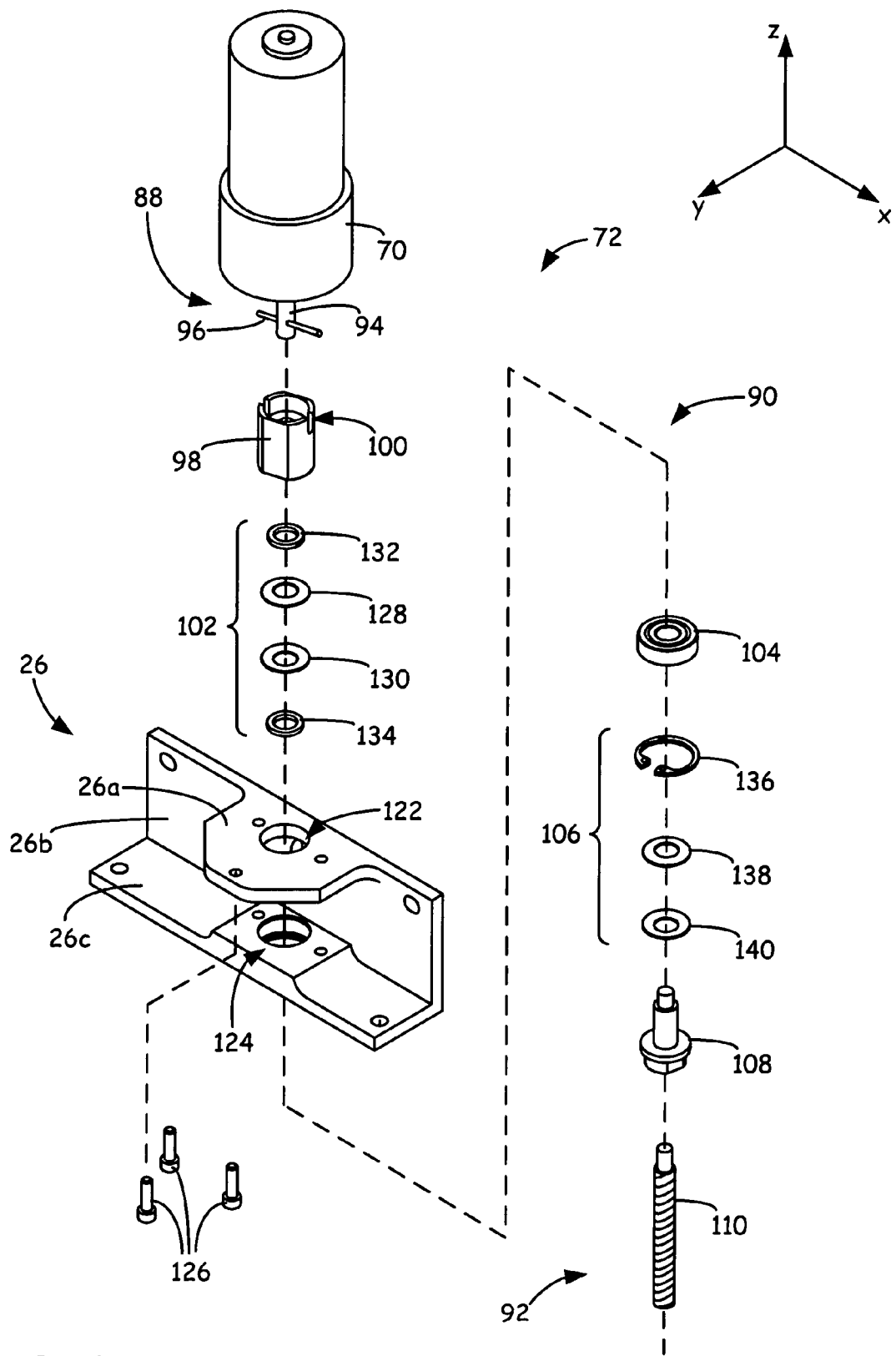
FIGS. 5A and 5B are exploded front perspective views of the extrusion head.
Figure 5B:
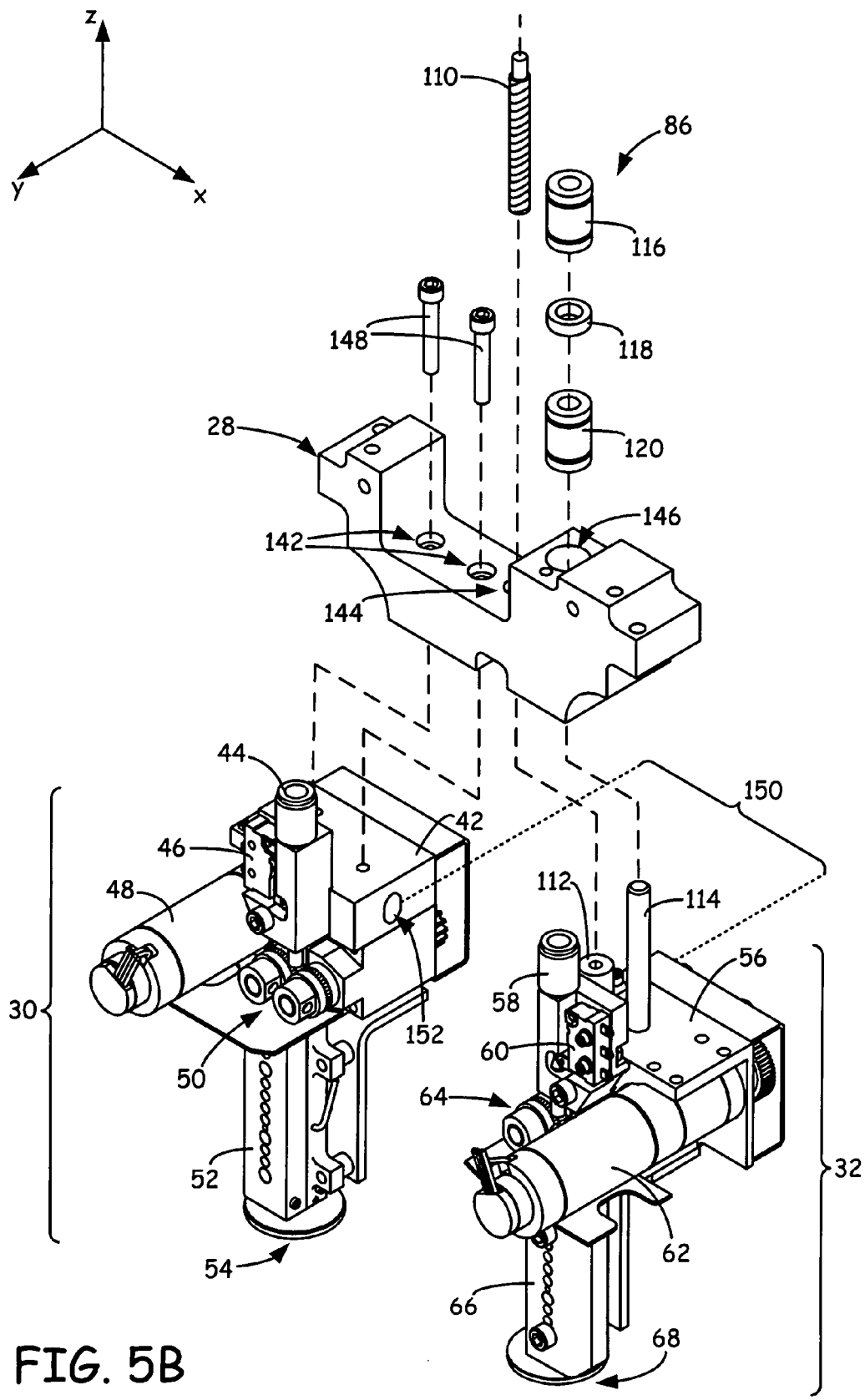

FIGS. 5A and 5B are exploded perspective views of extrusion head 18, further illustrating the components and assembly of toggle mechanism 34. As shown in FIG. 5A, ceiling portion 26a and floor portion 26c of motor bracket 26 respectively include openings 122 and 124, which are openings through which torque assembly 72 extends. Toggle motor 70 is secured to ceiling portion 26a with bolts 126, thereby positioning toggle motor 70 above opening 122 along the z-axis. Motor shaft 94 is inserted through opening 122 to allow coupling pin 96 to engage with coupling 98, where coupling 98 is positioned between ceiling portion 26a and floor portion 26c. Axial bolt 108 is inserted through floor portion 26c at opening 124, thereby positioning upper deflection assembly 102, bearing 104, and lower deflection assembly 106 within opening 124. As discussed above, threaded shaft 110 is secured to axial bolt 108. As such, threaded shaft 110 extends below opening 124 in floor portion 26c along the z-axis.

Upper deflection assembly 102 includes deflection disks 128 and 130 disposed between spacers 132 and 134. Deflection disks 128 and 130 are biasing components (e.g., Belleville washers) that reduce the shock load applied when support liquefier pump 32 (shown in FIG. 3) reaches the lowered position. This reduces the amount of stress applied to support liquefier pump 32 when the lowered position is reached.

Lower deflection assembly 106 includes clip 136 and deflection disks 138 and 140. Clip 136 is a retention clip for securing bearing 104 to floor portion 26c at opening 124. Deflection disks 138 and 140 are biasing components (e.g., Belleville washers) that reduce the shock load applied when support liquefier pump 32 (shown in FIG. 3) reaches the raised position. This reduces the amount of stress applied to support liquefier pump 32 when the raised position is reached.

As shown in FIG. 5B, spanner block 28 includes bolt holes 142, shaft opening 144, and bearing opening 146. Base block 42 of build liquefier pump 30 is secured to spanner block 28 with bolts 148, where bolts 148 extend through bolt holes 142. As discussed above, this prevents relative movement between build liquefier 30 and spanner block 28. Shaft opening 144 is a clearance hole extending through spanner block 28 along the z-axis, which provides a channel through which threaded shaft 110 extends to engage with retention nut 112. Bearing opening 146 is a precision drilled hole extending through spanner block 28 along the z-axis, which provides a channel through which linear bearing assembly 86 is pressed fitted into for guiding support liquefier pump 32 when moving between the raised and lowered positions. The press fit interference between linear bearing assembly 86 and bearing opening 146 is desirably balanced such that the friction is not too high for linear bearing assembly 86 to overcome, and such that the support liquefier pump 32 does not move in the x-y plane while extruding support material.

As further shown in FIG. 5B, extrusion head 18 further includes slot engagement mechanism 150, which correspondingly includes vertical slot 152. Vertical slot 152 is a slot within base block 42 that defines the range of motion along the z-axis for support liquefier pump 32 between the raised and lowered positions. As discussed below, the dimensions of vertical slot 152 allow support liquefier pump 32 to raise and lower with a reduced amount of frictional resistance, while also securely retaining support liquefier pump 32 to build liquefier pump 30 when support liquefier pump 32 is disposed in the raised and lowered positions.

Figure 6:
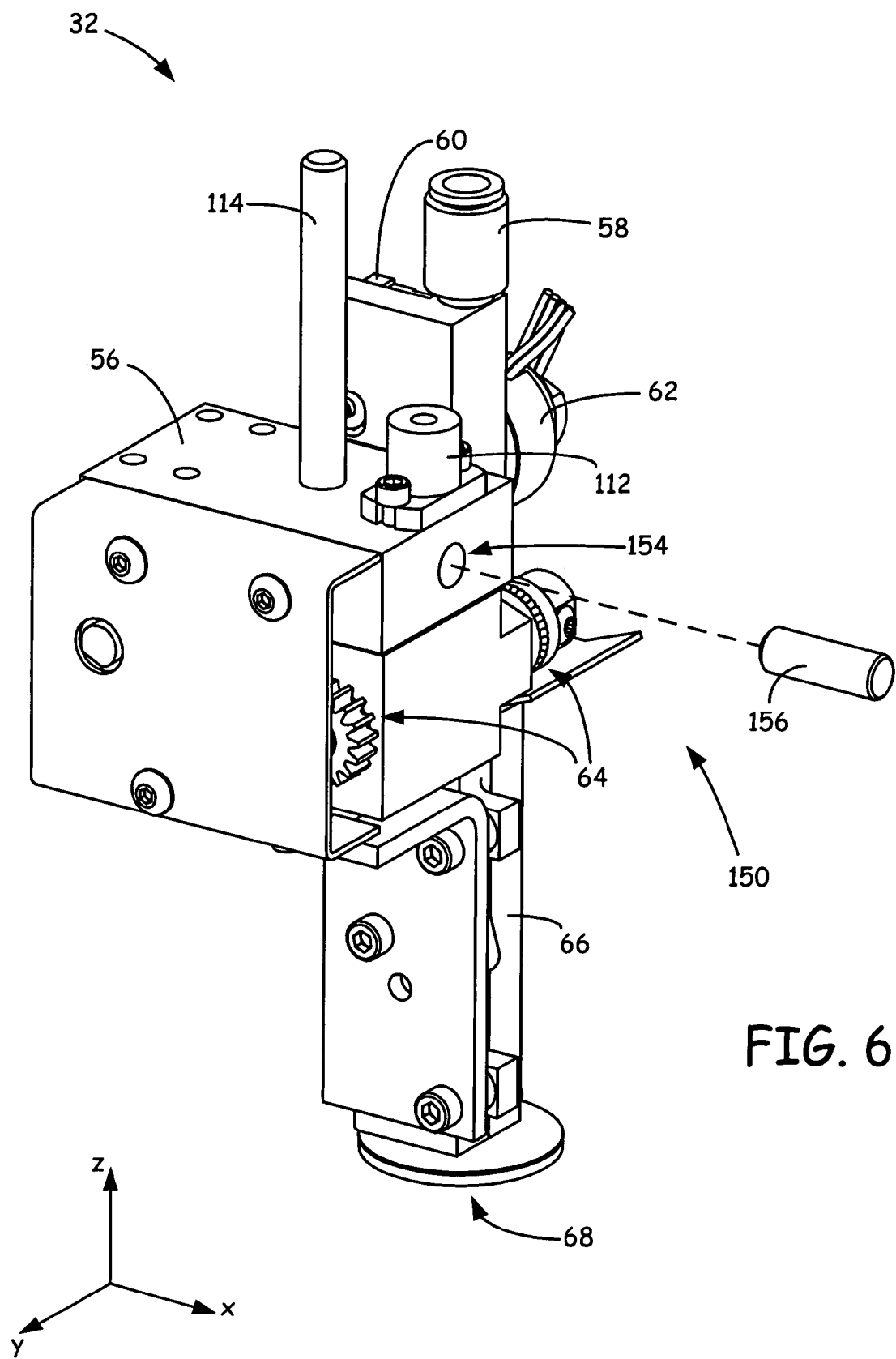
FIG. 6 is a rear perspective view of a support liquefier pump of the extrusion head.

FIG. 6 is a rear perspective view of support liquefier pump 32, which further illustrates slot engagement mechanism 150. As shown, slot engagement mechanism 150 further includes pin bore 154 and horizontal pin 156. Pin bore 154 is a hole extending along the x-axis within base block 56 of support liquefier pump 32. Horizontal pin 156 is an engagement member that is secured in pin bore 154 such that a portion of horizontal pin 156 extends beyond pin bore 154 along the x-axis. When build liquefier pump 30 (shown in FIG. 5B) and support liquefier pump 32 are mounted to spanner block 28 (shown in FIG. 5B), horizontal pin 156 is disposed in vertical slot 152 of base block 42 (shown in FIG. 5B). Accordingly, the movement of horizontal pin 156 along the z-axis within vertical slot 152 defines the range of motion for support liquefier pump 32 between the raised and lowered positions.

In one alternative embodiment, the locations of vertical slot 152 and horizontal pin 156 are interchanged. In this embodiment, base block 42 of build liquefier pump 30 (shown in FIG. 5B) includes pin bore 154 and horizontal pin 156, and base block 56 of support liquefier pump 32 includes vertical slot 152. Additionally, while slot engagement mechanism 150 is disclosed in use with horizontal pin 156, slot engagement mechanism 150 may alternatively use engagement members having a variety of different geometries and that are configured to engage with vertical slot 152 to define the range of motion for support liquefier pump 32 between the raised and lowered positions.

Figure 7:
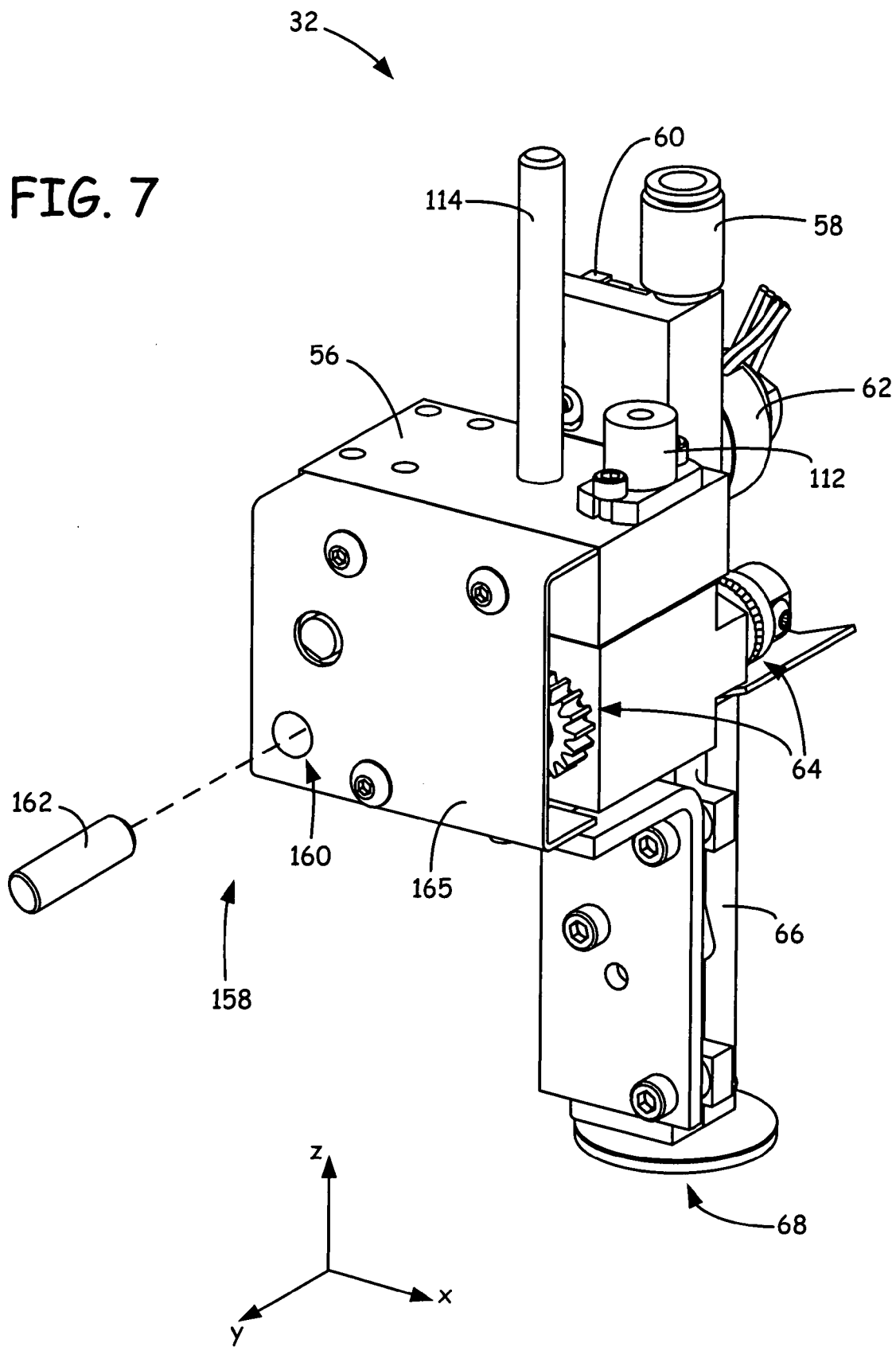
FIG. 7 is a rear perspective view of an alternative support liquefier pump of the extrusion head.

FIG. 7 is a rear perspective view of support liquefier pump 32, illustrating slot engagement mechanism 158, where slot engagement mechanism 158 is an alternative embodiment to slot engagement mechanism 150 (shown in FIG. 6). As shown in FIG. 7, slot engagement mechanism 158 includes pin bore 160 and horizontal pin 162, where pin bore 160 is a hole extending along the y-axis from a rear surface of liquefier pump 32 (referred to as rear surface 163). Horizontal pin 162 is an elongated pin that is secured in pin bore 160 such that a portion of horizontal pin 162 extends beyond pin bore 160 along the y-axis. In this embodiment, a vertical slot similar to vertical slot 152 (shown in FIG. 5B) is disposed on a component (not shown) that is immobile relative to spanner block 28 and build liquefier pump 30 (shown in FIG. 5B), but faces rear surface 163. As such, horizontal pin 162 is disposed in the vertical slot behind support liquefier pump 32 to define the range of motion for support liquefier pump 32 between the raised and lowered positions. Accordingly, pursuant to the present invention, slot engagement mechanisms (e.g., slot engagement mechanisms 150 and 158) may engage with support liquefier pump 32 from a variety of components that are substantially immobile relative to build liquefier pump 30.

Figure 8A:
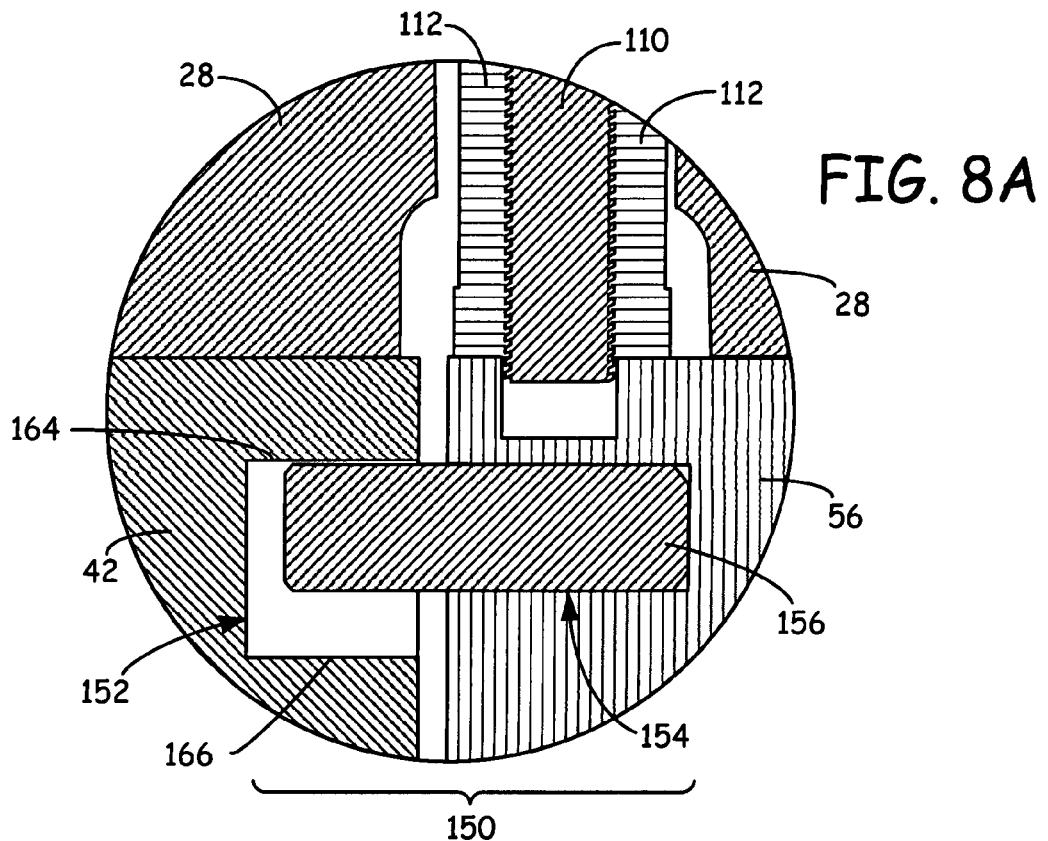
FIG. 8A is a sectional view of section 8A taken in FIG. 2A, depicting a slot engagement mechanism for the support liquefier pump of the extrusion head.
Figure 8B:
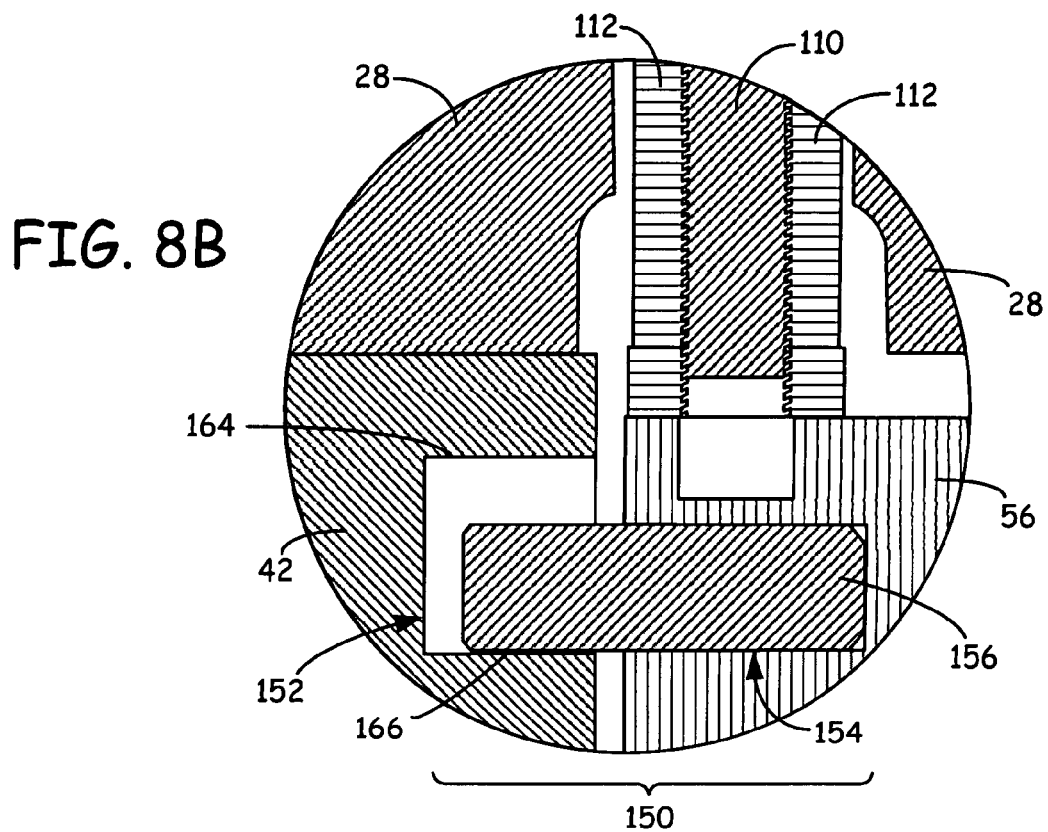
FIG. 8B is a sectional view of section 8B taken in FIG. 2B, further depicting the slot engagement mechanism for the support liquefier pump of the extrusion head.

FIGS. 8A and 8B are sectional views of sections 8A and 8B taken in FIGS. 2A and 2B, respectively, further illustrating slot engagement mechanism 150. As shown in FIG. 8A, vertical slot 152 includes top perimeter 164 and bottom perimeter 166, which provide the stopping points for horizontal pin 156 along the z-axis. During a toggling operation to move support liquefier pump 32 to the raised position, toggle motor 70 applies rotational power to toggle assembly 72 in the direction of rotational arrow 82 (shown in FIG. 2B). As discussed above, this rotates the components of toggle assembly 72, including threaded shaft 110. The threaded engagement between threaded shaft 110 and retention nut 112 coverts the rotational motion of threaded shaft 110 into vertical motion of retention nut 112. This raises retention nut 112, base block 56, horizontal pin 156, and the remaining components of support liquefier pump 32 in the direction of arrow 84 (shown in FIG. 2B).

The continued rotation of threaded shaft 110 raises support liquefier pump 32 until horizontal pin 156 contacts top perimeter 164. At this point, support liquefier pump 32 has reached the raised position, and extrusion head 18 is in the build state. Top perimeter 164 prevents support liquefier pump 32 from moving higher than the raised position, regardless of the power output of toggle motor 70. As discussed above, the excess rotational power applied from toggle motor 70 is absorbed by deflection disks 128 and 130 (shown in FIG. 5A).

FIG. 8B shows slot engagement mechanism 150 while support liquefier pump 32 is disposed in the lowered position. When toggling support liquefier pump 32 from the raised position to the lowered position, toggle motor 70 applies rotational power to toggle assembly 72 in the direction of rotational arrow 76 (shown in FIG. 2A). This rotates the components of toggle assembly 72, including threaded shaft 110, in the same rotational direction, which lowers retention nut 112, base block 56, horizontal pin 156, and the remaining components of support liquefier pump 32 in the direction of arrow 78 (shown in FIG. 2A).

The continued rotation of threaded shaft 110 lowers support liquefier pump 32 until horizontal pin 156 contacts bottom perimeter 166. At this point, support liquefier pump 32 has reached the lowered position, and extrusion head 18 is in the support state. Bottom perimeter 166 prevents support liquefier pump 32 from moving lower than the lowered position, regardless of the power output of toggle motor 70. As discussed above, the excess downward force applied from toggle motor 70 is absorbed by deflection disks 138 and 140 (shown in FIG. 5A).

Figure 9A:
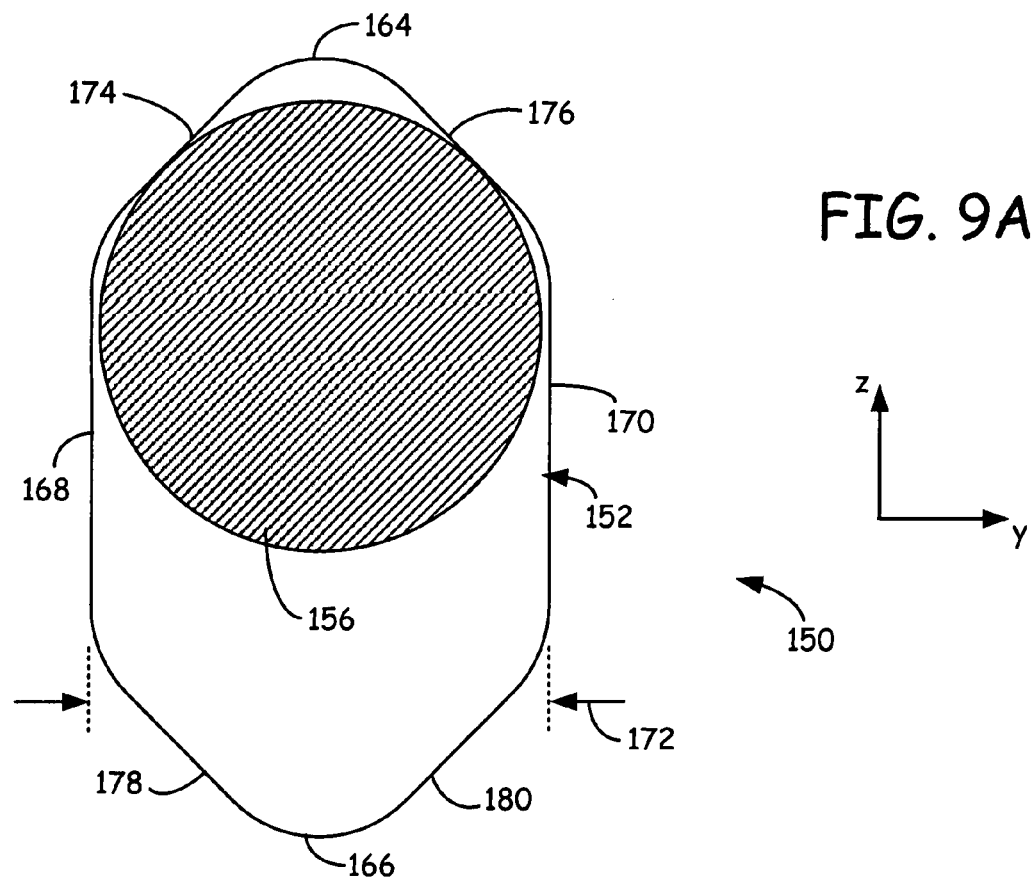
FIG. 9A is a side view of the slot engagement mechanism for the support liquefier pump of the extrusion head, where the extrusion head is disposed in the build state.
Figure 9B:
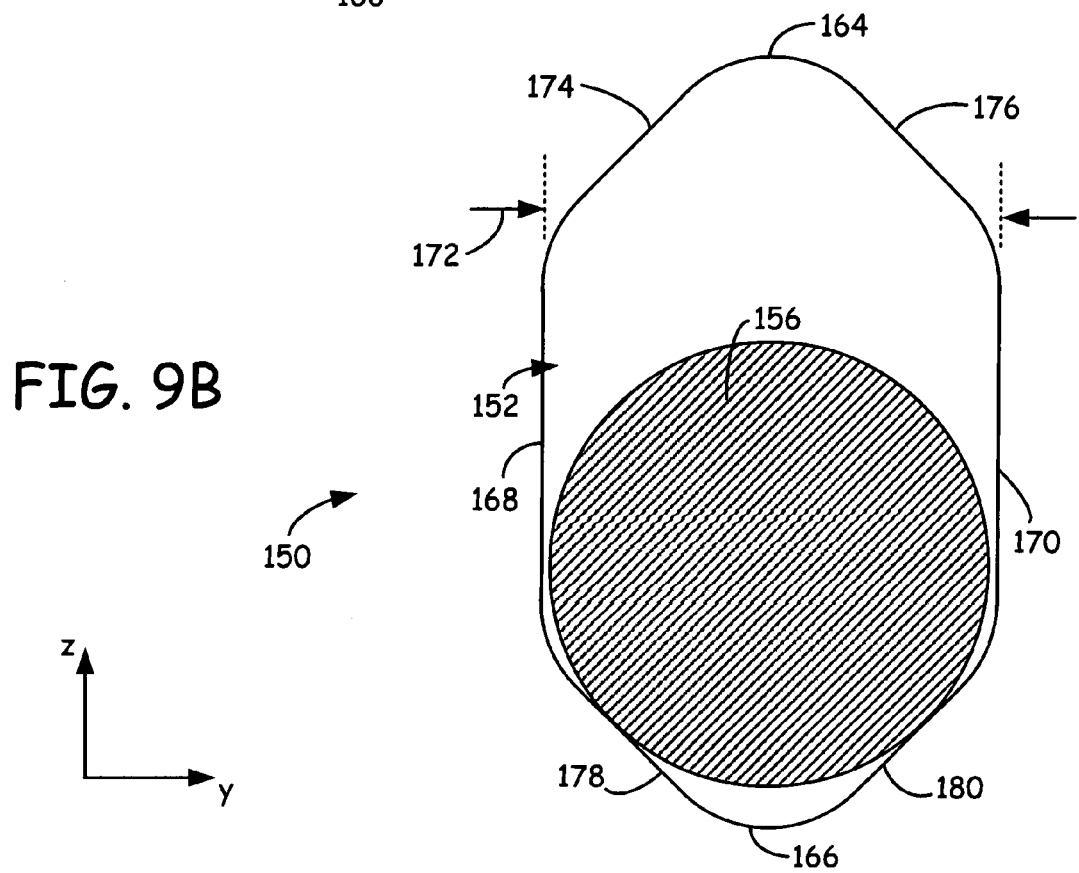
FIG. 9B is a side view of the slot engagement mechanism for the support liquefier pump of the extrusion head, where the extrusion head is disposed in the support state.

FIGS. 9A and 9B are side views of slot engagement mechanism 150, showing vertical slot 152 and horizontal pin 156 (horizontal pin 156 shown in section). As shown in FIG. 9A, horizontal pin 156 is disposed at top perimeter 164 of vertical slot 152, which corresponds to support liquefier pump 32 being in the raised position. Vertical slot 152 further includes left perimeter 168 and right perimeter 170, which are the opposing vertical walls of vertical slot 152. Left perimeter 168 and right perimeter 170 are offset along the y-axis by lateral offset distance 172, where lateral offset distance 172 is the average distance between left perimeter 168 and right perimeter 170 along the y-axis.

Lateral offset distance 172 is desirably greater than the diameter of horizontal pin 156, thereby reducing the frictional resistance between vertical slot 152 and horizontal pin 156 when horizontal pin 156 moves along the z-axis between the raised and lowered positions. Examples of suitable distances for lateral offset distance 172 include distances greater than 100% of the diameter of horizontal pin 156, with particularly suitable distances ranging from greater than 100% of the diameter of horizontal pin 156 to about 120% of the diameter of horizontal pin 156, and with even more particularly suitable distances ranging from about 105% of the diameter of horizontal pin 156 to about 110% of the diameter of horizontal pin 156.

Left perimeter 168 and right perimeter 170 converge toward top perimeter 164 with converging walls 174 and 176, thereby forming an inverted V-shape geometry at top perimeter 164. As such, when horizontal pin 156 moves upward along the z-axis, horizontal pin 156 contacts converging walls 174 and 176, thereby preventing further upward motion of horizontal pin 156. In the embodiment shown in FIG. 9A, converging walls 174 and 176 are disposed at a right angle to each other with the apex located at top perimeter 164. This arrangement prevents lateral movement of horizontal pin 156 along the y-axis when horizontal pin 156 contacts converging walls 174 and 176, while also desirably minimizing the frictional resistance with horizontal pin 156 along the z-axis.

As discussed above, when support liquefier pump 32 reaches the raised position, toggle motor 70 (shown in FIGS. 2A and 2B) desirably continues to apply a moderate amount of rotational power to torque assembly 72 (shown in FIGS. 2A and 2B) to retain support liquefier pump 32 in the raised position. This rotational power continues to pull horizontal pin 156 upward, which maintains the contact between horizontal pin 156 and converging walls 174 and 176. Accordingly, converging walls 174 and 176 physically prevent horizontal pin 156 from moving laterally along the y-axis while support liquefier pump 32 is maintained in the raised position. This is desirable to reduce lateral movement of support liquefier pump 32. During a build operation, extrusion head 18 moves around the x-y plane in rapid back-and-forth movements, which can cause vibrations in the components of extrusion head 18. Restricting the lateral movement of support liquefier pump 32 with the use of slot engagement mechanism 150 reduces the risk of causing a misalignment of support liquefier pump 32.

As shown in FIG. 9B, horizontal pin 156 is disposed at bottom perimeter 166 of vertical slot 152, which corresponds to support liquefier pump 32 being in the lowered position. Left perimeter 168 and right perimeter 170 also converge toward bottom perimeter 166 with converging walls 178 and 180, thereby forming a V-shape geometry at bottom perimeter 166. As such, when horizontal pin 156 moves downward along the z-axis, horizontal pin 156 contacts converging walls 178 and 180, thereby preventing further downward motion of horizontal pin 156. In the embodiment shown in FIG. 9B, converging walls 178 and 180 are disposed at a right angle to each other with the apex located at bottom perimeter 166. This arrangement prevents lateral movement of horizontal pin 156 along the y-axis when horizontal pin 156 contacts converging walls 178 and 180, while also desirably minimizing the frictional resistance with horizontal pin 156 along the z-axis.

As discussed above, when support liquefier pump 32 reaches the lowered position, toggle motor 70 (shown in FIGS. 2A and 2B) desirably continues to apply a moderate amount of rotational power to torque assembly 72 (shown in FIGS. 2A and 2B) to retain support liquefier pump 32 in the lowered position. This rotational power continues to push horizontal pin 156 downward, which maintains the contact between horizontal pin 156 and converging walls 178 and 180. Accordingly, converging walls 178 and 180 physically prevent horizontal pin 156 from moving laterally along the y-axis in the same manner as discussed above for converging walls 174 and 176, thereby further reducing the risk of causing a misalignment of support liquefier pump 32.

Engagement mechanism 150 also reduces the risk of misalignments due to the wear of one or more components of toggle mechanism 34. For example, if the threaded engagement between threaded shaft 110 and retention nut 112 wears down over extended periods of use, the conversion between rotational motion to vertical motion may correspondingly reduce. However, because toggle motor 70 continuously applies rotational power when raising or lowering support liquefier pump 32, horizontal pin 156 is continuously raised or lowered to reach top perimeter 164 and bottom perimeter 166, respectively. As such, toggle mechanism 34 may compensate for wearing down of components, thereby allowing toggle motor 70 to be controlled with an open loop process control arrangement. Accordingly, toggle mechanism 34 provides good durability and reliability for allowing extrusion head 18 to toggle between the build state and the support for building 3D objects and corresponding support structures.

Figure 10:
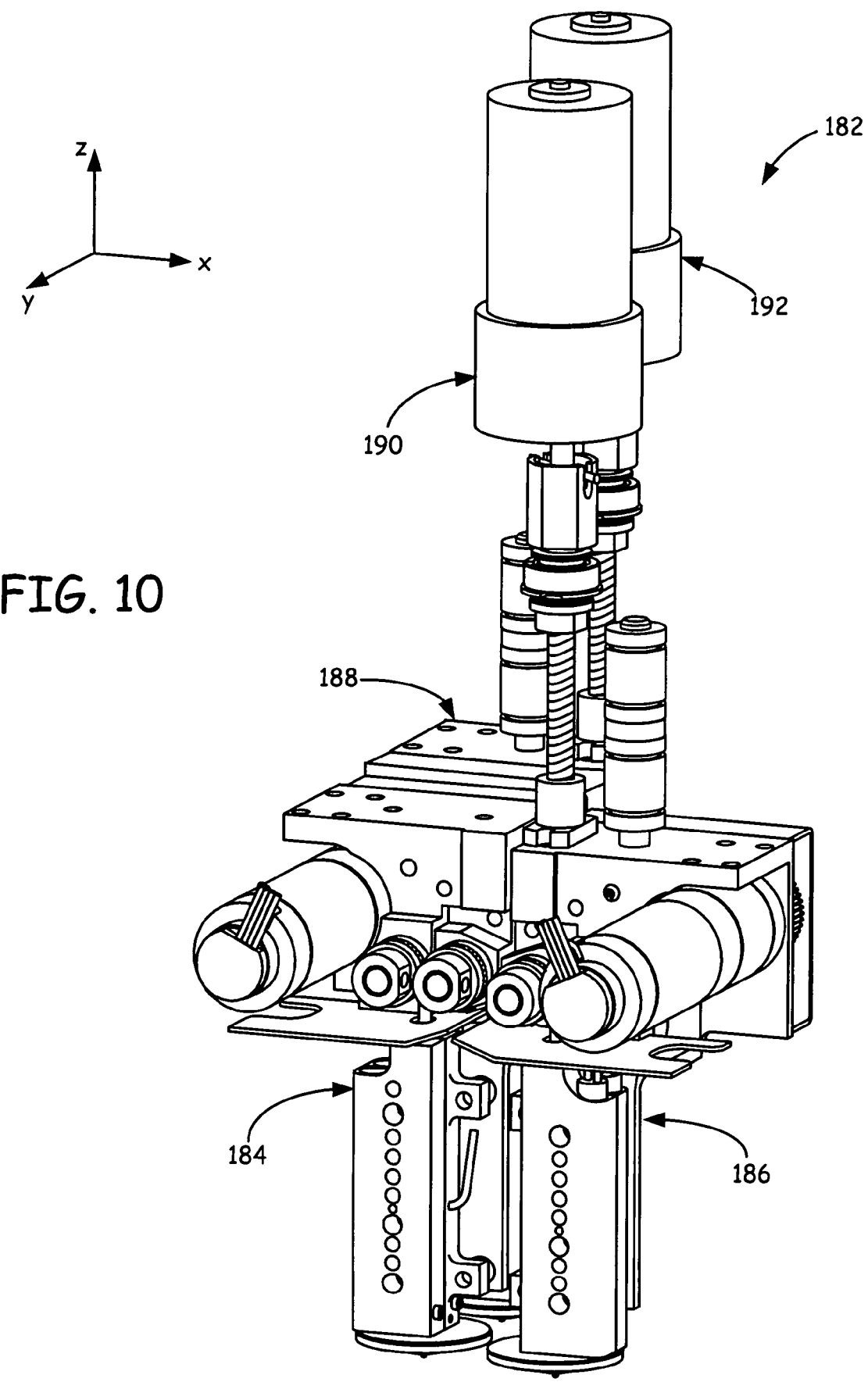
FIG. 10 is a front perspective view of an alternative extrusion head with components omitted, where the alternative extrusion head includes an additional liquefier pump.

FIG. 10 is a front perspective view of extrusion head 182, which is an alternative embodiment to extrusion head 18 (shown in FIGS. 1-3) that includes an additional liquefier pump and toggle mechanism. As shown in FIG. 10, extrusion head 182 includes build liquefier pump 184, support liquefier pump 186, supplemental liquefier pump 188, toggle mechanism 190, and toggle mechanism 192. Extrusion head 182 also includes an outer casing, cooling air lines, a circuit board bracket, a motor bracket, a spanner block, filament inlets for each liquefier pump, and filament detection switches for each liquefier pump (not shown). In the embodiment shown in FIG. 10, build liquefier pump 184, support liquefier pump 186, and toggle mechanism 190 function the same manner as discussed above for build liquefier pump 30, support liquefier pump 32, and toggle mechanism 34.

Supplemental liquefier pump 188 and toggle mechanism 192 provide an additional moveable liquefier pump for extrusion head 182, where supplemental liquefier pump 188 functions in the same manner as support liquefier pump 32 for extruding a third material. The third material may be a variety of different extrudable build and support materials, such as different colored materials, different material compositions, and combinations thereof. Moreover, supplemental liquefier pump 188 may incorporate different tip sizes for extruding the third material at a different flow rate than build liquefier pump 184 and support liquefier pump 186.

Toggle mechanism 192 is a mechanism secured to and/or engaged with the circuit board bracket, the motor bracket, and the spanner block, and is configured to adjust the position of supplemental liquefier pump 188 along the z-axis in the same manner as toggle mechanism 34. Examples of suitable raised and lowered offset distances for supplemental liquefier pump 188 relative to build liquefier pump 184 include those discussed above for support liquefier pump 32 (i.e., raised offset distance 74 and lowered offset distance 80).

During a build operation, when build liquefier pump 184 is extruding the build material (i.e., extrusion head 182 is disposed in the build state), support liquefier pump 186 and supplemental liquefier pump 188 are each retained in the raised positions by toggle mechanism 190 and toggle mechanism 192, respectively. When the deposition operation is complete, support liquefier pump 186 may be then be toggled to the lowered position to extrude the support material (i.e., extrusion head 182 is disposed in the support state). At this point, supplemental liquefier pump 188 is desirably retained in the raised position. Support liquefier pump 186 and supplemental liquefier pump 188 may then switch positions, such that support liquefier pump 186 is toggled to the raised position and supplemental liquefier pump 188 is toggled to the lowered position. Extrusion head 182 is then disposed in a third state, and supplemental liquefier pump 188 may extrude the third material without interference by build liquefier pump 184 or support liquefier pump 186.

In one embodiment, supplemental liquefier pump 188 engages with build liquefier pump 184 using a slot engagement mechanism (not shown) that functions in the same manner as slot engagement mechanism 158 (shown in FIG. 7). As such, build liquefier pump 184 may include a lateral slot engagement mechanism (not shown) corresponding to slot engagement mechanism 150 (shown in FIG. 6) to engage with support liquefier pump 186, and a rearward slot engagement mechanism corresponding to slot engagement mechanism 158 to engage with supplemental liquefier pump 188. Alternatively, slot engagement mechanisms may engage with liquefier pumps 186 and 188 from a variety of components that are substantially immobile relative to build liquefier pump 184.

Extrusion head 182 illustrates the use of additional numbers of liquefier pumps and toggle mechanisms for extruding additional materials to build 3D objects and corresponding support structures. Accordingly, extrusion heads of the present invention may include a plurality of liquefier pumps and toggle mechanisms, where at least one of the liquefier pumps (e.g., build liquefier pumps 30 and 184) is desirably secured to one or more of the mounting components, and the remaining liquefier pumps (e.g., support liquefier pumps 32 and 186, and supplemental liquefier pump 188) are retained and translated with the use of toggle mechanisms (e.g., toggle mechanisms 34, 190, and 192). Although the present invention has been described with reference to preferred embodiments, workers skilled in the art will recognize that changes may be made in form and detail without departing from the spirit and scope of the invention.

The invention claimed is:

1. An extrusion head comprising:
at least one mounting structure;
a first liquefier pump secured to the at least one mounting structure;
a second liquefier pump disposed adjacent to the first liquefier pump;
a toggle mechanism supported by the at least one mounting structure, and configured to move the second liquefier pump relative to the first liquefier pump along a first axis; and
a slot engagement mechanism connected in part to the second liquefier pump for defining a range of motion for the second liquefier pump along the first axis, wherein the slot engagement mechanism comprises a slot having a first perimeter and a second perimeter offset along the first axis and an engagement member disposed in the slot.

2. The extrusion head of claim 1, wherein one of the slot and the engagement member is disposed in the second liquefier pump.

3. The extrusion head of claim 2, wherein the second of the slot and the engagement member is disposed in the first liquefier pump.

4. The extrusion head of claim 2, wherein a contact between the engagement member and at least one of the first perimeter and the second perimeter of the slot substantially prevents movement of the second liquefier pump relative to the first liquefier pump along a second axis that is perpendicular to the first axis.

5. The extrusion head of claim 1, wherein the toggle mechanism comprises:
a motor secured to the at least one mounting structure;
a threaded actuator operably secured to the motor; and
a retention component secured to the second liquefier pump and threadedly engaged with the threaded actuator.

6. The extrusion head of claim 5, wherein the toggle mechanism further comprises:
a motor shaft secured to the motor, the motor shaft having a longitudinal length;
a coupling pin secured to the motor shaft in a direction orthogonal to the longitudinal length; and
a coupling operably secured to the threaded actuator and having at least one slot, wherein the coupling pin extends within the at least one slot.

7. The extrusion head of claim 1, wherein the range of motion for the second liquefier pump along the first axis comprises a first position and a second position, and wherein the second liquefier pump comprises a build tip that is aligned along the first axis when the second liquefier pump is disposed at the first position and at the second position.

8. The extrusion head of claim 1, wherein the toggle mechanism is a first toggle mechanism and the slot engagement mechanism is a first slot engagement mechanism, and wherein the extrusion head further comprises:
a third liquefier pump disposed adjacent to the first liquefier pump;
a second toggle mechanism supported by the at least one mounting structure, and configured to move the third liquefier pump relative to the first liquefier pump along the first axis; and
a second slot engagement mechanism connected in part to the third liquefier pump for defining a range of motion for the third liquefier pump along the first axis.

9. An extrusion head comprising:
at least one mounting structure;
a first liquefier pump secured to the at least one mounting structure;
a second liquefier pump disposed adjacent to the first liquefier pump, and comprising a first of a slot and an engagement member disposed in the slot for defining a range of motion for the second liquefier pump along a first axis;
a component substantially immobile relative to the first liquefier pump and that comprises a second of the slot and the engagement member; and
a toggle mechanism engaged with the second liquefier pump for moving the second liquefier pump along the first axis.

10. The extrusion head of claim 9, wherein the component that is substantially immobile relative to the first liquefier pump constitutes a portion of the first liquefier pump.

11. The extrusion head of claim 9, wherein the second liquefier pump comprises the engagement member and the component comprises the slot.

12. The extrusion head of claim 9, wherein the slot has a first perimeter and a second perimeter offset along the first axis, and wherein a contact between the engagement member and at least one of the first perimeter and the second perimeter of the slot substantially prevents movement of the second liquefier pump relative to the first liquefier pump along a second axis that is perpendicular to the first axis.

13. The extrusion head of claim 9, wherein the toggle mechanism comprises:
   a motor secured to the at least one mounting structure;
   a threaded actuator operably secured to the motor; and
   a retention component secured to the second liquefier pump and threadedly engaged with the threaded actuator.

14. The extrusion head of claim 13, wherein the range of motion for the second liquefier pump along the first axis comprises a first position and a second position, and wherein the second liquefier pump comprises a build tip that is aligned along the first axis when the second liquefier pump is disposed at the first position and at the second position.

15. An extrusion head comprising:
   at least one mounting structure;
   a motor secured to the at least one mounting structure;
   a threaded actuator operably secured to the motor, wherein the motor is configured to rotate the threaded actuator;
   a first liquefier pump secured to the at least one mounting structure, and comprising a first of a slot and an engagement member, the slot having a first perimeter and a second perimeter offset along a first axis; and
   a second liquefier pump threadedly engaged with the threaded actuator, wherein the second liquefier pump comprises a second of the slot and the engagement member, the engagement member being disposed in the slot between the first perimeter and the second perimeter, and wherein the rotation of the threaded actuator moves the second liquefier pump along the first axis.

16. The extrusion head of claim 15, wherein a contact between the engagement member and at least one of the first perimeter and the second perimeter of the slot substantially prevents movement of the second liquefier pump relative to the first liquefier pump along a second axis that is perpendicular to the first axis.

17. The extrusion head of claim 15, further comprising:
   a motor shaft secured to the motor, the motor shaft having a longitudinal length;
   a coupling pin secured to the motor shaft in a direction orthogonal to the longitudinal length; and
   a coupling operably secured to the threaded actuator and having at least one slot, wherein the coupling pin extends within the at least one slot.

18. The extrusion head of claim 15, further comprising at least one deflection disk operably secured between the motor and the threaded actuator.

19. The extrusion head of claim 15, wherein the slot also has a third perimeter and
   a fourth perimeter offset along a second axis that is perpendicular to the first axis by a first offset distance that is greater than a diameter of the engagement member.

20. The extrusion head of claim 15, wherein the motor is a first motor and the threaded actuator is a first threaded actuator, and wherein the extrusion head further comprises:
   a second motor secured to the at least one mounting structure;
   a second threaded actuator operably secured to the second motor, wherein the second motor is configured to rotate the second threaded actuator;
   a third liquefier pump threadedly engaged with the second threaded actuator; and
   a slot engagement mechanism connected in part to the third liquefier pump for defining a range of motion for the third liquefier pump along the first axis.

* * * * *